United States Patent Office 3,397,036
Patented Aug. 13, 1968

3,397,036
PROCESS FOR THE PREPARATION OF
POLYAMMONIUM PHOSPHATES
Arthur Paul Narins, Los Angeles, Calif., James Austin, Maidenhead, England, John D. Ellis, Lakeland, Fla., and Alan Conners, Chalfont St. Giles, England, assignors to Occidental Research & Engineering Limited, London, England, a British company
Filed Nov. 9, 1965, Ser. No. 507,014
Claims priority, application Great Britain, Nov. 16, 1964, 46,597/64
10 Claims. (Cl. 23—106)

ABSTRACT OF THE DISCLOSURE

A process for reacting high-strength wet process phosphoric acid with anhydrous ammonia by feeding continuously such acid to a closed reaction zone and causing the acid to form a moving layer therein, feeding continuously anhydrous ammonia to said zone to contact an exposed surface of said acid layer, continually scraping to remove the reacted surface layer thereby to expose acid underlying such surface to the ammonia, and removing continuously the ammoniated acid reaction product from said zone at a region of said layer spaced from the region of acid feed to such layer.

Figure 1:
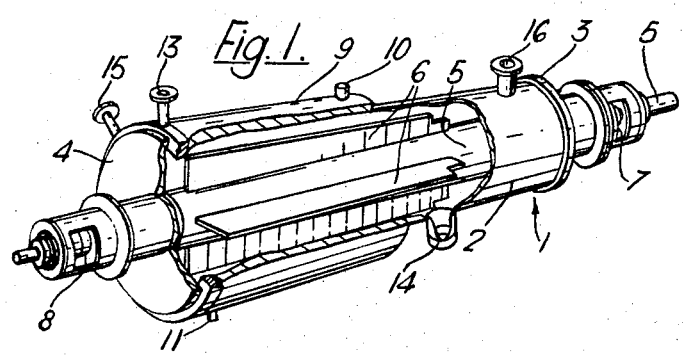

This invention concerns gas/liquid reaction processes and is especially concerned with processes involving reaction of a gas with a viscous liquid or with a liquid that becomes viscous during the course of reaction. Specifically, the invention is concerned with the ammoniation of high-strength wet-process phosphoric acids ($P_2O_5$ content greater than 68% w./w.) with or without other material such as sulphuric acid and/or nitric acid in admixture therewith, to produce ammonium phosphate (and other ammonium) compounds, since such reaction is difficult to perform at a satisfactory rate for economic large-scale commercial purposes, e.g. for the production of fertilizer compositions or intermediates.

In accordance with the invention, a process for reacting high-strength wet-process phosphoric acid with anhydrous ammonia comprises continuously feeding such acid to a closed reaction zone and causing the acid to form a moving layer therein; continuously feeding anhydrous ammonia to said zone to contact an exposed surface of said acid layer; continually stirring said acid layer by scraping a film from the said exposed surface of the layer, thereby to expose acid underlying such surface to the ammonia; and continuously removing the ammoniated acid reaction product from said zone at a region of said layer spaced from the region of acid feed to such layer.

The invention in a further aspect provides a process for reacting high-strength wet-process phosphoric acid with anhydrous ammonia, comprising continuously feeding the acid into a reaction zone defined within a circular section reactor vessel equipped with blades adapted to be rotated about the axis of the vessel continuously to sweep the curved wall thereof with small clearance, thereby to cause the acid to form a layer, on such wall, which is continually stirred by the blades to expose a fresh surface to the void bounded by the acid, and continuously feeding the anhydrous ammonia to the said void bounded by the acid layer, so as to be absorbed by the acid at the exposed surface thereof, and continuously withdrawing the reaction product from the vessel at a point axially spaced from the point of introduction of the acid to the vessel.

The anhydrous ammonia may be fed in either the liquid or gaseous phase. If fed in the liquid phase it will vaporise in the reaction zone.

If the high-strength phosphoric acid feed contains other material in admixture therewith the reaction product will of course include, where appropriate, the products of the reaction between ammonia and such other material.

In accordance with a further feature of the invention water may be added to the reaction zone separately of the feed acid, to produce a non-hygroscopic product with certain feed acids.

In accordance with yet another feature of the invention, a phosphoric acid solution of relatively low $P_2O_5$ content, for instance a wet-process phosphoric acid concentrated to a $P_2O_5$ content of about 54% w./w., may be fed to the reaction zone to be ammoniated therein along with the high-strength acid.

The reactor vessel may be cylindrical or it may be frusto-conical, the latter form being of advantage when the acid and/or the product have viscosities of certain values.

Thus, when the acid and product both have relatively low viscosities, it is desirable to use a frusto-conical reactor vessel fed with acid near the larger diameter end with product withdrawal near the smaller diameter end, since the centrifugal force exerted on the acid by the rotation of the blades will have a component along the wall contrary to the flow direction, whereby the acid will be caused to form a satisfactory layer of suitable thickness on the wall.

On the other hand, with acids and products of very high viscosity, a frusto-conical reactor vessel fed with acid near the smaller diameter end thereof with product withdrawal near the larger diameter end utilizes centrifugal force to assist flow of the acid along the wall in a satisfactory layer.

The blades may be parallel with the axis of their rotation or they may present a helical trace to the curved wall of the reactor vessel, to assist the application of desired forces to the acid to achieve a required distribution and movement of the acid on curved wall.

It will be understood that the reaction within the vessel may be performed under chosen conditions of pressure and temperature, the vessel preferably being provided with double walls between which (or a jacket within which) fluid, e.g. steam, water or the fluid known as "Dowtherm," may be circulated to obtain and maintain a required wall temperature in contact with the acid, the vessel also being appropriately sealed so as to enable the ammonia to be held under a required pressure therewithin.

The process of the invention is particularly applicable to the ammoniation of phosphoric acid solutions having a $P_2O_5$ content of the order of 80% w./w. Such phosphoric acid solutions are exceptionally viscous and the ammoniation thereof is slow and difficult to perform on a large scale for the obtaining of a consistent ammoniated product. For instance, it has been proposed to effect such ammoniation in a conventional stirred pressure autoclave with ammonia pressures of 35 p.s.i.g. and higher at temperatures somewhat above 100° C.; experience shows that even when the reactants are introduced at such rates as to give a retention time in the autoclave in the order of 45–60 minutes the product has a composition showing the reaction to be incomplete.

On the other hand, experiment has shown that by the process of the present invention, phosphoric acid solutions of about 79% $P_2O_5$ w./w. at about 100° C. may be ammoniated to produce a homogeneous ammonium polyphosphate product with a retention time in the reactor vessel in the order of 1 to 3 minutes under an ammonia pressure of only about 30 p.s.i.g. or less. The product on cooling sets to a hard glass and in 5% aqueous solution has a pH of 6.2; analysis shows such product to contain the equivalent of about 14% nitrogen and about 66% $P_2O_5$. Experiments have shown that the degree of ammoniation can be readily controlled by variations in the reaction zone temperature, the ammonia pressure and the rotational speed of the blades within the reactor vessel, and that it is easily possible to obtain products that, in aqueous solution have a neutral pH.

Figure 2:
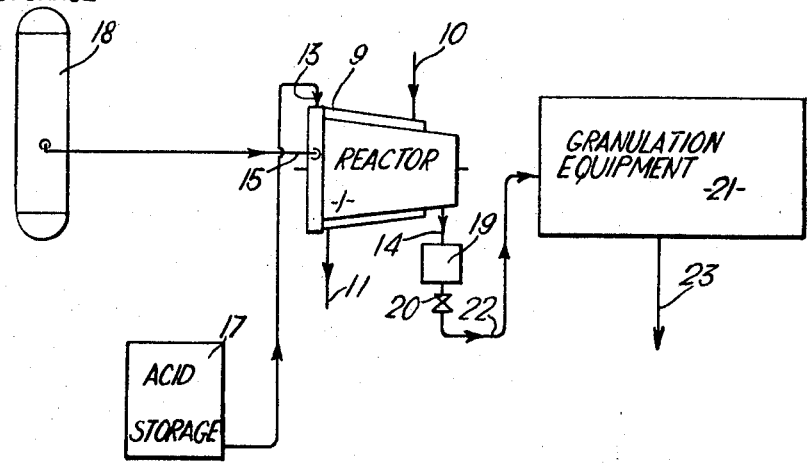

The invention will be further described with reference to the accompanying drawings forming a part hereof and wherein:

FIGURE 1 is a part-sectional perspective view of a typical reactor of the construction preferred for performance of the process of the invention; and FIGURE 2 is a flowsheet diagram illustrating certain equipment employed in conjunction with the reactor of FIGURE 1.

FIGURE 1 of the accompanying drawings illustrates the construction of a typical reactor for performance of preferred embodiments of the process of the invention; in the following description, the principal dimensional data relate to a reactor sized for the performance of the process of the invention on a pilot scale, but it should be understood that except as regards the blade clearance values hereinafter mentioned, the reactor may, within limits imposed by engineering considerations, be scaled-up in size for operation at throughput rates very many times greater than those hereinafter indicated.

Thus for the pilot-scale embodiments of the invention described, the reactor, generally indicated at 1 in the drawings, comprises a frusto-conical vessel 2 having a closure cap 3 at its smaller end and a closure cap 4 at its larger end; it is disposed with its axis horizontal and has, internally, an overall length of 12" and diameters of 4½" and 3½", respectively, at its opposite ends. The reactor 1 further comprises an axial shaft 5 extending through sealing glands in the end closure caps 3, 4, this shaft carrying four equiangularly-spaced radial blades 6 disposed to sweep the internal wall of the vessel 2 with a clearance adjustable from about 1/64 to about ¼ of an inch, the blades 6 having a thickness of 3/16". The shaft 5 is coupled to an electric motor (not shown) through a variable-reduction ratio gearbox (not shown) by which the shaft 5 may be rotated at speeds in the range 500–2000 r.p.m.

Adjustment of the clearance between blades 6 and the internal wall of vessel 2 is accomplished by axial adjustment of the shaft 5 within the vessel; for this purpose, the end closure caps 3, 4 mount thrust bearings 7, 8 respectively with means for adjusting the bearings 7, 8 axially with respect to the caps.

The major part of the length of the vessel 2 is enclosed by a jacket 9 having an inlet 10 and an outlet 11 for fluid for controlling the temperature of the jacket-enclosed area of the vessel 2.

The reactor vessel 2 has an acid inlet 13 in its conical wall near the larger diameter end of the vessel and a product outlet 14 in such wall but near the smaller diameter end of the vessel. The vessel further has an ammonia inlet 15 communicating with the vessel interior near the axis thereof, via a passage in the end closure cap 4. A valved outlet vent 16 enables the interior of the vessel to be purged of inert atmosphere when required.

The gases withdrawn from outlet 16 may be passed to condensing equipment and, if desired, the ammonia may be separated and absorbed in acid (for instance the acid being fed to inlet 13) to recover ammonia.

It should be understood that the locations of the various inlets and outlets 13–16 may be varied, provided that the acid inlet 13 and the product outlet 14 are substantially spaced apart in the direction of the axis of the vessel 2. For instance, the ammonia inlet may be located wherever convenient to conduct the inflowing ammonia to the axial region of the vessel and may, for example, be combined with either of outlets 14, 16.

Referring now to FIGURE 2, the reactor 1 of FIGURE 1 is illustrated diagrammatically with its jacket 9. The acid inlet 13 is shown connected to an acid feed tank 17 and the ammonia inlet 15 is shown connected to an ammonia supply 18, it being understood that FIGURE 2 does not show the pumps, valves and metering devices that would be employed to cause and regulate the flow of these reactants to the respective inlets 13, 15. FIGURE 2 also shows the product outlet 14 of the reactor 1 as being connected to a seal vessel 19 having a valved outlet 20 and level-indicating equipment (not shown) whereby vessel 19 may be maintained sufficiently filled with product to prevent escape of ammonia from the reactor through the vessel 19. Finally, FIGURE 2 shows a block 21, connected to outlet 20 of vessel 19 via a heated line 22, representing granulation or other equipment to which the reaction product of reactor 1 is fed for conversion to a desired final form. Thus, the molten reaction product may be granulated, pelletized or prilled, either alone or in combination with other material(s) added thereto, to emerge as a required product at 23. It should be understood that equipment 21 may alternatively merely comprise a casting device for filling containers with the molten product which will set therein to a hard glassy mass when the feed acid is of the appropriate $P_2O_5$ content.

In some preliminary experiments with this equipment, a phosphoric acid solution having a $P_2O_5$ content of about 79% w./w. and produced by the process disclosed in the specification of co-pending application No. 440,185, now U.S. Patent No. 3,276,510 was fed into the vessel 2 of the reactor 1 through the liquid inlet thereof at a rate of about 4 gallons per hour (63 lbs. $P_2O_5$ per hour), the solution being at a temperature of about 100° C. (212° F.), the wall of the vessel 2 being first raised to and thereafter maintained at about this temperature by circulation of coolant (boiling water) through the jacket 9. The shaft 5 was rotated at about 1000 r.p.m. and ammonia gas was introduced into the vessel 2 through the gas inlet 15 at a rate such as to maintain a pressure of about 30 p.s.i.g. within the vessel. The reactor product was continuously withdrawn through the product outlet 14. Calculation shows that the phosphoric acid solution was retained in the reactor vessel 2 for about 2¼ minutes.

Under these conditions, the product was a viscous ammonium polyphosphate which, on cooling, set to a homogeneous hard glassy product containing the equivalent of about 14% nitrogen and about 66% $P_2O_5$ and which, in 5% aqueous solution, had a pH of 6.2. This product showed hygroscopic properties on initial contact with the atmosphere but on prolonged contact with the atmosphere the outer surfaces became dry.

Surprisingly, it was found that if a very small quantity of water were introduced into the reactor vessel, separately from the acid, the product, although of slightly lower nitrogen and $P_2O_5$ analysis, set to a hard glassy mass that was non-hygroscopic. Such a non-hygroscopic product was, for example, produced by process conditions identical with those above-described except for the addition to the reactor vessel of water at a rate of about 0.4 gallon per hour. The product in such case contained the equivalent of about 13% nitrogen and 62% P₂O₅.

In some further experiments with such equipment the process conditions and results were as follows:

| Example No. | 1 | 2 | 3 | 4 | 5 |
|---|---|---|---|---|---|
| Feed Acid: | | | | | |
| Total P₂O₅ (w./w.) | 77.4 | 77.4 | 72.9 | 72.9 | 72.9 |
| Ortho P₂O₅ (w./w.) | 17.1 | 17.1 | 36.2 | 36.2 | 36.2 |
| Non-ortho P₂O₅ (Percent of Total P₂O₅) | 77.9 | 77.9 | 50.3 | 50.3 | 50.3 |
| Feed rate (acid) (lbs. P₂O₅ per hr.) | 60 | 37 | 41.5 | 77 | 102.0 |
| Clearance of blades 6 (in.) | 1/16 | 1/16 | 1/16 | 1/16 | 1/16 |
| Speed (rpm) | 1,000 | 1,000 | 1,000 | 1,000 | 1,000 |
| Ammonia (pressure in reactor vessel), p.s.i.g. | 20 | 20 | 20 | 20 | 20 |
| Temperature, °F | 380–400 | 380–400 | 380–400 | 380–400 | 380–400 |
| (Product at 14° C.) | 195–205 | 195–205 | 195–205 | 195–205 | 195–205 |
| Product: | | | | | |
| Percent N | 10.2 | 10.5 | 12.8 | 11.9 | 11.5 |
| Percent P₂O₅ (Total) | 67.6 | 67.1 | 61.3 | 61.7 | 62.1 |
| Percent P₂O₅ (ortho) | 12.5 | 13.3 | 26.6 | 26.6 | 27.3 |
| Non-ortho P₂O₅ (Percent of Total P₂O₅) | 81.5 | 80.2 | 56.6 | 56.9 | 56.0 |
| Condensed Water (lbs. per lb. P₂O₅) | 0 | 0 | 0.006 | 0.006 | 0.006 |

In carrying out these experiments, the reactor vessel jacket 9 was first raised to a temperature of about 95° C. (200° F.) by passing steam through the jacket 9 before admission of reactants to the vessel 2.

The reactants were then admitted to the vessel 2; as a result of the exothermic nature of the reaction, the temperature of the reaction product, sensed in the vicinity of outlet 14, rose. When the product temperature had reached about 175° C. (350° F.), water at about 60° C. (140° F.) was introduced into jacket 9 and the flow of such water adjusted until the product temperature had stabilized within the range indicated in the foregoing tabulation. The tabulated product analyses were made in respect of the product obtained following such temperature stabilization.

During the first two experiments the vent 16 was kept closed; in the remaining experiments, which differed only in respect of the acid feed rate, vent 16 was open to the condensing equipment connected thereto and water was collected in each case at the rate, tabulated, of 0.006 lb. per lb. of P₂O₅ introduced into the reactor vessel.

Thus the product of such remaining experiments showed a higher analysis than was expected from ammoniation of the acid in question and the process, as carried out in these experiments, led to an unexpectedly improved product equivalent to that expected only from ammoniation of a more highly concentrated feed acid.

The tabulated experiments were designed to prove the effectiveness of the process at a relatively low ammonia pressure; the results should be compared with those of the preliminary experiments conducted with a higher ammonia pressure (about 30 p.s.i.g.) which led to reaction products of higher nitrogen analysis. Other experiments have confirmed that at higher ammonia pressures products of considerably greater nitrogen analysis may be obtained without significant diminution of throughput.

The tabulated experiments were repeated with reduced distance (1/32 inch) between blades 6 and the wall of the vessel 2, and with shaft 5 rotating at different speeds in the range 500–2000 r.p.m. The results showed no significant differences from those of the tabulated experiments.

The products obtained by reaction, as by the process of the invention, of high-strength phosphoric acid and ammonia alone have a low nitrogen/P₂O₅ ratio but are useful directly for certain fertilizer purposes: as described below such products may be blended with other materials that will give rise to composition of higher nitrogen/P₂O₅ ratio but we have found that it is feasible, by the process of the invention, to produce products of higher nitrogen/P₂O₅ ratio by feeding to the reactor vessel, separately of or in admixture with the phosphoric acid, nitric acid and/or sulphuric acid that reacts with the ammonia without loss of the desirable property, in the product, of setting to a hard glassy mass.

The tendency of such products to set to a hard glassy mass of considerable strength distinguished them from the products of ammoniating phosphoric acid solutions of similar strength in a conventional stirred autoclave. The products may therefore be assumed to have a different constitution due perhaps to more uniform and/or more complete reaction. Such products could be cast, with or without additives for subsequent blending, into blocks for transport and processing, or they could be cast into rods, pellets or bars which dissolve slowly in water and which could therefore be utilized, for instance, for adding fertilizer values to water flowing in an irrigation system or hose pipe.

The products could also be compounded, e.g. whilst molten, with other materials such as, for instance, urea, ammonium nitrate or sulphate, potassium chloride or sulphate, trace minerals (iron and magnesium oxides, boric acid, zinc sulphate and sulphur), inert fillers (sawdust, woodflour, absorbent silicates, etc. to produce lightweight, low-density fertilizer compositions), dyes (for colour coding of compositions), pesticides and insecticides, all as may be desirable for the production of valuable fertilizer compositions. Such compounded products could be granulated, pelletized, prilled or otherwise shaped as might be desired.

The foregoing description relates primarily to the practice of the invention to accomplish the ammoniation of high-strength phosphoric acid alone or in admixture with acidic materials different from phosphoric acid. The invention also extends to the ammoniation of high-strength phosphoric acid concurrently with a phosphoric acid solution of lower strength that is introduced into the reaction zone in such manner that hydrolysis of the polyphosphoric acids in the high-strength acid, prior to ammoniation, is at least substantially avoided.

Thus in modifications of the process described, a phosphoric acid solution, e.g. of P₂O₅ content of about 54% P₂O₅, is fed to the reaction zone concurrently with the high-strength acid, either separately of the latter or by mixing therewith adjacent to the high-strength acid inlet to the reaction zone. The heat evolved in the ammoniation reaction will serve to vaporize some of the water content of the lower-strength acid so that if the reaction zone is appropriately vented of the steam thereby produced, the final product may have a higher P₂O₅ analysis than predictable from consideration of the totals of P₂O₅ and water, fed to the reaction zone, in the two acid streams. Moreover, the utilization of reaction heat for "concentration" of the lower-strength acid reduces the cooling requirements of the reaction zone and enables a reactor having a given reaction zone cooling capability to operate at a higher throughput than in the case of ammoniation of high-strength acid alone.

By feeding an appropriate proportion of a phosphoric acid solution of about 54% P₂O₅ content with the high-strength acid for concurrent ammoniation therewith, there may be obtained a reaction product having a P₂O₅ analysis corresponding with that expected from ammoniation of a phosphoric acid of P₂O₅ content in the range 60–69% w./w. but with a much greater polyphosphate content.

It should also be understood that the feeding of the anhydrous ammonia to the reaction zone in the liquid phase enables the latent heat of vaporization of the ammonia to be utilized for partial absorption of the heat of reaction, thereby to reduce the reaction zone cooling requirements for a given throughput.

We claim:

1. A process for reacting high-strength wet-process phosphoric acid with anhydrous ammonia, comprising continuously feeding such acid to a closed reaction zone and causing the acid to form a moving layer therein; continuously feeding anhydrous ammonia to said zone to contact an exposed surface of said acid layer; continually scraping to remove the reacted surface layer thereby to expose acid underlying such surface to the ammonia; and continuously removing the ammoniated acid reaction product from said zone at a region of said layer spaced from the region of acid feed to such layer.

2. A process for reacting high-strength wet-process phosphoric acid with anhydrous ammonia, comprising continuously feeding the acid into a reaction zone defined within a circular section reactor vessel equipped with blades adapted to be rotated about the axis of the vessel continuously to sweep the curved wall thereof with small clearance, thereby to cause the acid to form a layer, on such wall, which is continually scraped by the blades to expose a fresh surface to the void bounded by the acid, and continuously feeding the anhydrous ammonia to the said void bounded by the acid layer, so as to be absorbed by the acid at the exposed surface thereof, and continuously withdrawing the reaction product from the vessel at a point axially spaced from the point of introduction of the acid to the vessel.

3. A process for reacting high-strength wet-process phosphoric acid with anhydrous ammonia, comprising continuously feeding such acid to a closed reaction zone and causing the acid to form a moving layer therein; continuously feeding anhydrous ammonia to said zone to contact an exposed surface of said acid layer; continually scraping a film from the said exposed surface of the layer, thereby to expose acid underlying such surface to the ammonia; continuously removing the ammoniated acid reaction product from said zone at a region of said layer spaced from the region of acid feed to such layer, and feeding additional material selected from the group consisting of water and a phosphoric acid solution to said reaction zone for incorporation in the reaction product.

4. A process according to claim 3, wherein said additional material undergoes reaction with at least one of the reactants fed to said zone.

5. A process according to claim 3, wherein said additional material is water and is fed to the reaction zone separately of the acid feed thereto.

6. A process according to claim 3, wherein said additional material is a phosphoric acid solution and is fed to the reaction zone in a manner effective to minimise hydrolysis of polyphosphoric acids in the high-strength phosphoric acid fed to the reaction zone.

7. A process according to claim 6, wherein said solution has a $P_2O_5$ content of about 54% w./w. and is fed in an amount such as to introduce into the reaction zone the equivalent of a phosphoric acid of $P_2O_5$ content in the range 60–69 w./w.

8. A process according to claim 1, wherein the ammonia in contact with the exposed surface of the acid layer in said reaction zone is maintained at a pressure not less than about 20 p.s.i.g.

9. A process according to claim 1, wherein the said acid layer in the reaction zone is maintained at a temperature of about 200° C.

10. A process according to claim 1, including withdrawing from the reaction zone steam evolved in the reaction therein, thereby to obtain a reaction product of increased phosphate analysis.

References Cited

UNITED STATES PATENTS 3,323,897   6/1967   Brownlie et al. _____ 71—37

OSCAR R. VERTIZ, *Primary Examiner.*

L. A. MARSH, *Assistant Examiner.*